Figure 1:
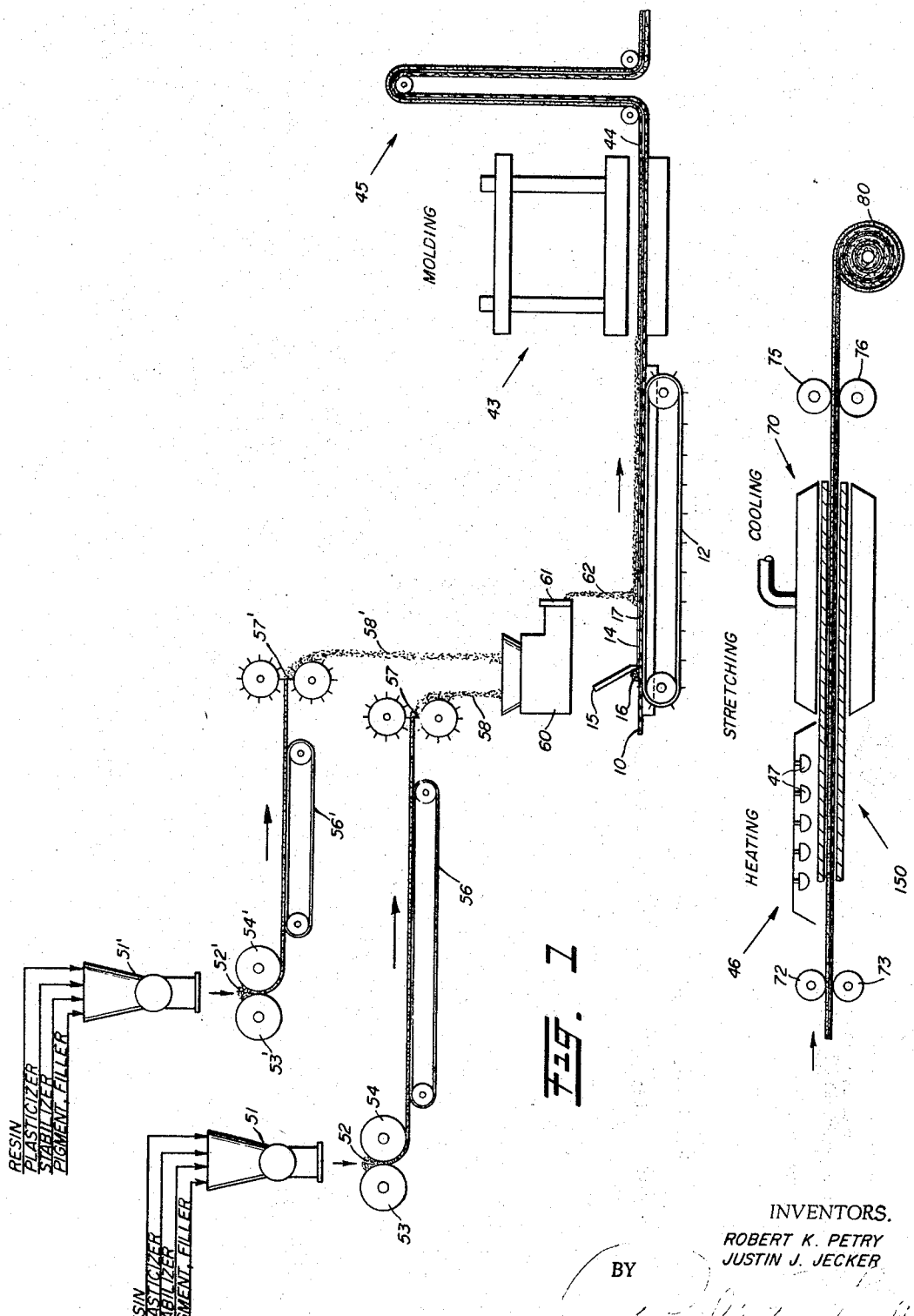

Aug. 29, 1967  R. K. PETRY ET AL  3,339,001
PROCESS FOR PREPARING FELT-BACKED LAMINATES
Filed Nov. 27, 1963  2 Sheets-Sheet 2

INVENTORS.
ROBERT K. PETRY
JUSTIN J. JECKER,
BY
ATTORNEY

United States Patent Office 3,339,001
Patented Aug. 29, 1967

3,339,001
PROCESS FOR PREPARING FELT-BACKED LAMINATES
Robert K. Petry, Mountain Lakes, and Justin J. Jecker, Newfoundland, N.J., assignors to Congoleum-Nairn Inc., Kearny, N.J., a corporation of New York
Filed Nov. 27, 1963, Ser. No. 326,605
16 Claims. (Cl. 264—231)

This invention relates to a method for producing decorative surface coverings and particularly such surface coverings having a fibrous felt backing.

Thermoplastic compositions have been used very extensively for the decorative and wear-resistant layer of flexible, smooth surface coverings. The composite sheets usually are made adherent to a backing sheet such as a fibrous felt sheet impregnated with a strengthening and water-resistant material. In accordance with present commercial practice, the plastic surface coverings are composed of plasticized, thermoplastic synethetic resinous binders, pigments, stabilizers, fillers and the like. They are prepared in sheet or tile form and widely used as coverings for floors, walls, vehicle interiors and the like. They usually range in thickness from about 0.020 inch to about 0.125 inch.

Vinyl resins are most generally employed as the primary resin in plastic surface covering compositions. Polyvinyl chloride and its copolymers, particularly polyvinyl chloride copolymerized with vinyl acetate are used in the greatest quantities. Plasticizers are normally added to improve the flexibility of the composition. Conventionally, this is accomplished by mixing all of the ingredients of the surface covering composition under conditions of high heat in a device, such as a Banbury mixer. In this manner, the thermoplastic resin is solvated by the plasticizer and well mixed with the fillers, pigments and stabilizers. The heat causes the thermoplastic resin to become soft and tacky, and then in conjunction with the effect of the plasticizer, it is able to function as a binder for the entire composition during processing. After mixing, the composition is sheeted by passing it through calender rolls operating at the softening temperature of the composition which is usually of the order of 250° to 375° F. The sheet is then converted into granules or flakes by passing through a granulating appaartus. Granules thus prepared are mixed with similar granules of contrasting coloration and the mixture of granules is formed into a sheet. The formation into a sheet is accomplished in either of two major ways. The mixture of granules can be fed to the nip of a pair of calender rolls which form the granules into a sheet. The sheet can be passed through several calendering operations to reduce the gauge of the sheet, put a smooth surface on the sheet and form a variety of decorative effects in the sheet. The sheet is then laminated to a felt backing by utilizing an adhesive. A method for accomplishing this is shown in U.S. Patent 2,757,711 which issued to Robert K. Petry et al. on Aug. 7, 1956.

The second method of forming a surface covering involves depositing the mixture of granules in a smooth layer on the surface of a felt sheet and subjecting the granules to a pressing operation by the application of heat and pressure. The heat must be sufficient to fuse the granules together to form a uniform sheet. It is common practice in such a procedure to apply an adhesive to the surface of the felt to aid in adhesion of the sheet formed to the felt. The pressing operation is conventionally carried out in a hydraulic press. It can be carried out, however, in a rotary press. Such a press usually has a large smooth surfaced drum against which the sheet is pressed. A belt, either of rubber or metal, is pressed against the back of the sheet by a series of pressure rolls.

As is apparent from these operations, substantial heat history is built into the composition. The stress and strain created very commonly results in a product which has a tendency to curl. This can be overcome in certain instances by subjecting the sheet to an annealing operation wherein the temperature of the sheet is raised and held at the elevated temperature to allow the sheet to relax, and then the sheet is allowed to return to normal temperature. This method, however, is not altogether satisfactory, and it is not uncommon to have a surface covering curl upwards. Additionally with a sheet having a felt backing such a procedure increases the curl. The felt sheet backing does not have sufficient strength to overcome the tendency of the composite sheet to curl. This curl can result in the separation of the felt from the composition and can even cause the felt to pull away from an adhesive bonding it to the surface covered. This curling can additionally be caused by the felt absorbing moisture which causes the felt to expand.

It has been proposed to coat the back of the felt sheet with polyvinyl alcohol. This resin will shrink and counteract the tendency of the floor covering to curl. This system is not altogether effective since the degree of curl of a sheet in the machine direction is usually substantially different than in the cross-machine direction. By "machine direction" is meant the direction in which the sheet is produced. In the case of a calendered sheet, this direction is at right angle to the calender roll axis. As can be seen, therefore, the use of a backing coating which shrinks equally in all directions while being effective in one direction would not be effective in the other directon to prevent curl.

An object of the invention is to provide a process for eliminating the tendency of surface coverings having a fibrous felt backing sheet to curl. Another object of the invention is to provide such a process which is readily adaptable to high speed processing. A further object is to provide such as process which can be carried out in a simple and effective manner. Other objects and the advantages of the invention will appear hereinafter.

In accordance with the invention, it has been discovered that fibrous felt sheets and particularly such sheets which are impregnated with a resinous composition have essentially elastomeric properties. Accordingly, a felt sheet can be stretched below its breaking elongation and when the tension is released, it will return to its original condition with little or no set or permanent elongation. For most flooring felts, the maximum elongation is about 2.0%. When the felt is stretched in one direction, there is a corresponding "necking down" in the opposite direction which also recovers when the force is removed. Most floor coverings are prepared with the sheet under positive tension caused by moving the surface covering through the various operations in production. The felt sheet, therefore, is also under positive tension in the machine direction. Relaxation or removal of the tension results in a slight machine direction shrinkage and cross-machine growth. This contributes to greater curl in the cross-machine direction. Curl is also caused by thermal contraction of a thermoplastic composition wear layer when it is formed by heat and pressure on the surface of a fibrous felt backing. Upon cooling, the thermoplastic composition contracts while the fibrous felt backing remains relatively unchanged in dimensions. It has been found that the elastic recovery of the felt is roughly comparable to the thermal contraction of the thermoplastic composition wear layer upon cooling from its fusion temperature to room temperature. This, however, is also dependent on the gauges of the sheets. It has been discovered that by stretching a thermoplastic composition-felt sheet laminate in both directions, heating to remove any mechanical strains in the composition, cooling the laminate while still under tension and then releasing the tension, the thermal contraction of the thermoplastic composition can be balanced by the elastic recovery of the felt.

In addition, it has been discovered that full recovery from elongation of the felt sheet is accelerated by moisture. By proper control of the stretching process, sufficient strain can be introduced into the felt backing so that it will actually shrink when exposed to moist conditions. This characteristic can be adjusted so that it will balance the normal felt growth from moisture absorption resulting in a flat laminate.

The stretching of the felt-thermoplastic composition laminate can be accomplished in a number of ways. One of the simplest methods is to use a tenter frame which is conventional in the textile industry. Such a machine has clamps which tighten on the edge of the sheet so that it can be stretched in the cross-machine direction. The tension placed on the sheet by the unwinding and winding apparatus can serve for placing tension on the sheet in the machine direction if desired. As an alternative, a spreading roll can be utilized for the stretching wherein the laminate as it passes around the roll is subjected to increasing cross sheet tension. A somewhat similar result can be obtained with one or more convex or increasing convex shape rolls. The convex bending of the sheet causes the sheet to be stretched. If this bending takes place when the laminate is at room temperature, tension is placed on the thermoplastic layer. As soon as the thermoplastic layer is heated, the tension is removed since the heated composition sheet has no strength at elevated temperatures.

As indicated, stretching of the laminate has to be carried out at elevated temperatures. It is preferred for the temperature to be in the area of fusion temperature of the composition. For compositions containing vinyl resin, this will vary from about 300° F. to 375° F. It is required to allow the sheet to cool to at least 200° F. before releasing the tension. It is preferred to allow the sheet to be cooled to room temperature or about 70° F.–100° F. before releasing from the tension.

Figure 2:
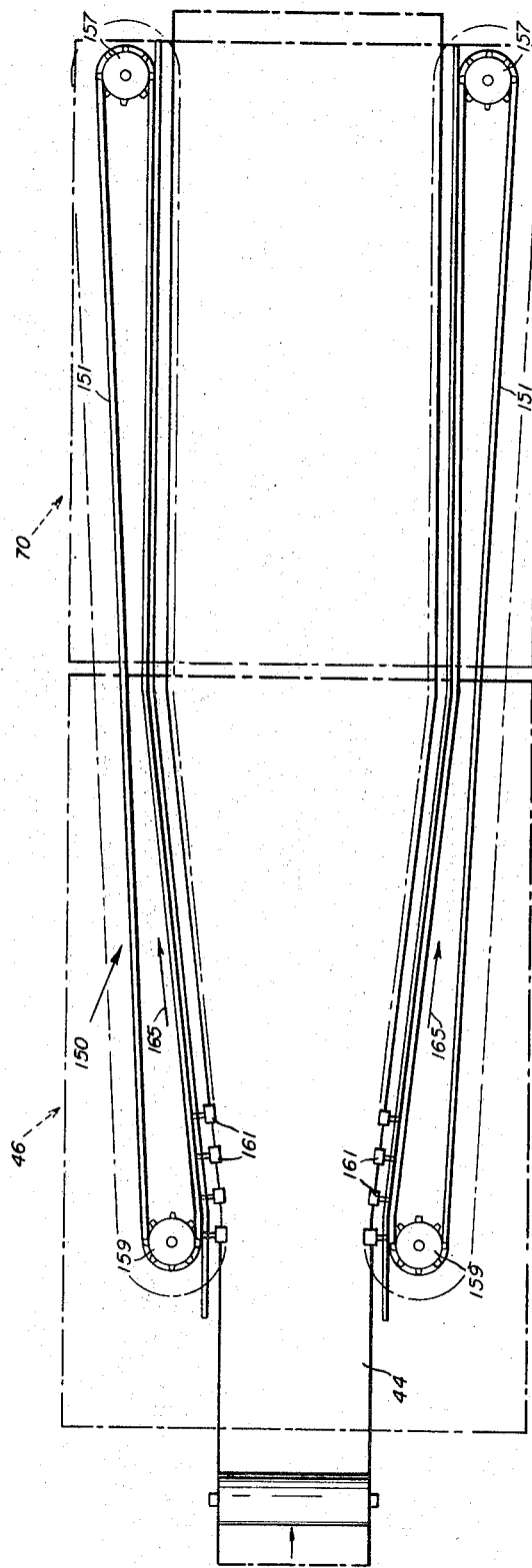
Figure 3:
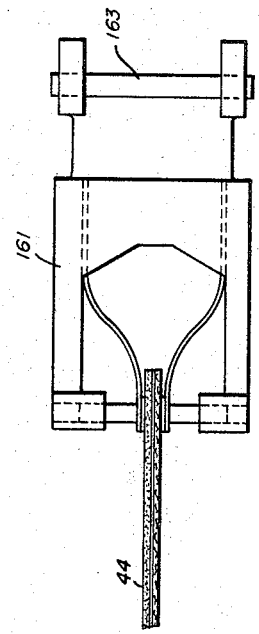

The invention will be better understood from the following detailed description when read in conjunction with the accompanying drawings, wherein FIGURE 1 is a schematic representation illustrating one method of producing a decorative plastic surface covering in accordance with the invention;

FIGURE 2 is a top view of a typical apparatus for stretching the laminate. The amount of stretch is magnified for illustration purposes; and FIGURE 3 is a side elevation showing a clamp of the apparatus of FIGURE 2 holding the edge of the laminate.

A fibrous felt backing sheet 10 is fed to a continuous conveyor 12. An adhesive coating 14 is applied to the surface of the web by any suitable means, such as a doctor blade 15 from a reservoir of adhesive composition 16. Mixed granules 62 of resinous compositions are then distributed over the coated web 17. The granules are of different pigmentation and are prepared separately by supplying resin, plasticizer, filler, pigment and stabilizer to different Banbury mixers 51, 51' which are operated at about the fusion temperature of the resin. Utilizing the preferred vinyl polymer, this is usually about 300° F. to about 375° F. The ingredients are intimately mixed and solvated by the plasticizer. The fused composition 52, 52' drops from the mixer into the nip between a pair of heated rotating calender rolls 53, 53', 54, 54' from which a pigmented sheet of resinous composition is withdrawn. The sheet is carried by a conveyor belt, 56, 56' into a rotary cutting unit 57, 57' in which the sheet is cut into a plurality of granules 58 and 58'.

The two groups of granules are dropped into a tumbling device 60 which intermingles them and then they pass to the distribution device 61. The coated sheet is conveyed under the distributing device which distributes the mixture of granules 62 of resinous composition over the surface of the sheet. Any type of feeder can be utilized for distributing granules, such as a syntron vibrating feeder. The granules are deposited by the feeder in a smooth uniform layer of any desired thickness. The sheet can be vibrated to smooth the layer of granules, if desired. The covered sheet is then passed to a pressing unit generally indicated at 43 for consolidating the granules into a uniform sheet 44 by the application of heat and pressure. If desired, the granules can be preheated prior to pressing to reduce the time of the pressing cycle. A press release paper can be fed between the granules and the upper platen of the press to prevent the sheet from sticking to the press. The consolidated sheet is then passed to a festooner generally indicated at 45 for converting the stepwise movement of the sheet through the press 43 to a continuous movement and for placing the desired machine direction tension on the sheet in cooperation with collecting roll 80. The consolidated sheet can be further heated, if required by the composition utilized, by passing through a heating unit generally indicated at 46, such as a bank of infrared heat lamps 47.

The sheet, while heated, is passed to a stretching device generally indicated at 150 which comprises a pair of laterally spaced endless conveyors 151. The conveyors are trained around sprockets 157 and 159 and are each formed of a series of sheet engaging clips 161 which are pivotally interconnected by pins 163 into a flexible endless arrangement. At least one of each pair of sprockets is driven by conventional means, not shown, to advance the endless conveyors along directions as indicated by the arrows 165 with track means, not shown, being provided for guiding the adjacent opposing reaches of the conveyors along desired divergent paths.

The endless conveyors 151 slidably engage with the longitudinal edges of the sheet 44 in the oven 46 and carry the same along the desired divergent paths to thus stretch the sheet in a transverse direction. The sheet is maintained in the stretched condition while it passes through a cooling chamber generally indicated at 70. When the sheet has been cooled to the desired temperature, the clamps are removed and the tension removed from the sheet. If desired, auxiliary rolls 72, 73, and 75, 76, can be utilized to stretch the sheet in the machine direction by controlling the relative speed of the rolls. In this manner, the tension on the sheet can be released in both directions at the same time.

The greatest amount of curl in a felt backed laminate is in the cross-machine direction. In many instances, the amount of curl in the machine direction is negligible, and therefore, stretching of the laminate, in accordance with the invention, is only required in the cross-machine direction. The usual amount of stretching is from about 0.5 to about 2.0% of the original length or width. The stretching can extend beyond the elastic limit of the felt sheet, but it must be below the breaking point of the felt sheet. As a general rule, the elastic limit and breaking point of the felt sheet are substantially identical.

The backing is a felted cellulose or mineral fibrous sheet which can be impregnated with a water-proofing and strengthening saturant. The sources of cellulose can include cotton or other rags, wood pulp, paper boxes, or mixtures thereof in any proportion. Asbestos is the most commonly used mineral fiber. In addition to celuulose and mineral fibers, other fibers are used including synthetic fibers and those of animal origin. Fillers such as wood flour are also added. A slurry of the fibrous material in water is formed into a sheet using any of the techniques conventionally employed in the manufacture of paper. For example, sheet formulation can take place on a Fourdrinier or cylinder sheet forming machine. The fibrous sheet so prepared is then dried.

Felted fibrous sheets as produced by conventional sheet forming techniques are usually unsatisfactory for use as backings for surface covering products without impregnation with a water-proofing and strengthening impregnant, due to poor strength and water resistance. The particular impregnant chosen must not only be capable of imparting strength and water resistance to the sheet, but must also meet other requirements as to its physical and chemical behavior at high temperatures. The backing can be heated to temperatures as high as 300° F. to 400° F. in order to fuse the composition layer. Thus, the impregnant chosen must be stable at these temperatures. The impregnant should be substantially free of any components which are volatile at these temperatures and it also must not soften to such an extent as to exude from the sheet. In addition, the impregnant should not be subject to appreciable detrimental chemical changes such as oxidation.

Suitable impregnants include vinyl resins, such as polymers of vinyl chloride and vinyl acetate. Particularly suitable are copolymers of vinyl acetate and vinyl chloride or these monomers copolymerized with other monomers copolymerizable therewith. In addition, polymerized acrylic and methacrylic acids and their polymerized derivatives polyethylene, polystyrene, butadiene-styrene copolymer, butadiene-acrylonitrile copolymer, natural rubber, polymerized chloroprene and the like are suitable. Thermosetting resins which under the influence of heat cure by polymerizing and cross-linking with the cellulose can also be used as impregnants. Such resins as phenolic resins, polyesters, oleoresins such as drying oils and the like, isocyanates and polyurethanes and the like are also useful.

These resins can be incorporated into the felted fibrous sheet by impregnation of the sheet with an emulsion or solution of the resin followed by drying of the sheet to remove the solvent. Alternately, the resin can be added in fine particles to the fiber furnish prior to sheet formation either as solid particles of resin or as an emulsion in water or other emulsifying vehicle.

The composition which forms the wear layer of the laminate comprises a mixture of a thermoplastic resin, plasticizer, stabilizers, pigments and the like. Useful thermoplastic resins include polymers and copolymers of vinyl resins, such as polymers of vinyl chloride, styrene, methylstyrene, butadiene and the like. Polymers of vinyl chloride have found particularly widespread use in the formulation of wear layer composition. The vinyl chloride polymers can either be simple, unmixed homopolymers of vinyl chloride or polymers thereof in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of other monomers are polymerized therein. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl chloracrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, choroprene, 2,3-dimethylbutadiene-1,3, piperylene, divinyl ketone and the like.

In order to demonstrate the advantages of this invention, various samples of laminated sheets were tested and the results tabulated in Table 1. Sample A is a cellulosic felt sheet of 0.043 inch in thickness, impregnated with asphalt, having a vinyl chloride composition wear layer of 0.003 inch in thickness. Sample B is a calendered vinyl chloride composition sheet of 0.025 inch in thickness, laminated with an adhesive to a felt sheet of 0.043 inch in thickness, impregnated with about 5 percent of a cured urea-formaldehyde resin and 20 percent of synthetic rubber. Sample C is molded vinyl chloride composition of 0.030 inch in thickness, laminated to an asbestos sheet of 0.043 inch and impregnated with 20 percent of a synthetic rubber.

Samples A and B of these products 10′ x 10′ were stretched in the machine direction 0.5 percent and 1.5 percent in the cross-machine direction. Similar samples of C were stretched 0.75 percent in machine direction and 1.9 percent in cross-machine direction. The samples, while stretched, were heated for 3 minutes in an air oven at 365° F. to 400° F., the samples were then cooled to 70° F. and the tension released. Samples 6′ x 6′ were cut from the center of the larger samples and placed on the surface of concrete blocks which had half the blocks in a tank of water. Due to capillary action, the block was saturated with water. The samples were allowed to reach moisture equilibrium that required approximately 24 hours. Controls which have had no special treatment were similarly tested. This is a standard test which accelerates the curl of the product. Curl measurements (distance between underedge of the sheet and the block) are recorded in Table 1.

TABLE 1

| Samples | Machine Direction Curl (inches) | Cross Machine Direction Curl (inches) |
| --- | --- | --- |
| A | 0.073 | 0.087 |
| B | 0.106 | 0.080 |
| C | 0.018 | 0.018 |
| Control A | 0.350 | 0.343 |
| Control B | 0.371 | 0.561 |
| Control C | 0.035 | 0.070 |

Any departure from the foregoing description which conforms to the invention is intended to be included within the scope of the claims.

What is claimed is:

1. A process of producing a curl-resistant laminate comprising a thermoplastic composition sheet bonded to a fibrous felt sheet, which comprises heating the laminate to release inherent strains in the thermoplastic sheet, elongating the laminate within the elastic limits of the felt sheet thereby placing tension on the felt sheet, cooling the laminate while maintaining the elongated condition and then removing the tension on the cooled laminate.

2. The process of producing a curl-resistant laminate according to claim 1 wherein said thermoplastic composition is a vinyl resinous composition.

3. The process of producing a curl-resistant laminate according to claim 2 wherein said vinyl resinous composition is a vinyl chloride resin composition.

4. A process of producing a curl-resistant laminate comprising a thermoplastic composition sheet bonded to a fibrous felt sheet, which comprises stretching the laminate within the elastic limit of the felt sheet thereby placing tension on the felt sheet, heating the laminate while maintaining said tension to release any inherent strains in the thermoplastic sheet, cooling the laminate while maintaining said tension and then removing said tension on the cooled laminate.

5. A method of producing a curl-resistant laminate comprising a thermoplastic composition sheet bonded to a fibrous felt sheet, which comprises heating the laminate to remove the strains in the thermoplastic sheet, applying a force in the plane of the laminate to elongate the laminate within the elastic limit of the felt sheet, cooling the elongated sheet and then releasing the elongating force from the cooled sheet.

6. The process of claim 5 wherein said force is applied in the cross-machine direction of said laminate.

7. The process of claim 5 wherein said force is applied in both the cross-machine direction and the machine direction of said laminate.

8. The process of claim 5 wherein said heating and said elongating are carried out simultaneously.

9. The processing of claim 5 wherein said heating of the laminate is carried out within the temperature range of about 300 to 375° F.

10. The process of claim 5 wherein the sheet is cooled to a temperature of below 200° F.

11. The process of claim 5 wherein the sheet is cooled to a temperature of about 70 to about 100° F.

12. The process of claim 5 wherein said elongation is about 0.5 to about 2 percent of the width of the felt sheet.

13. The process of claim 5 wherein said felt sheet is a cellulosic fibrous sheet.

14. The process of claim 5 wherein said felt sheet is an asbestos fibrous sheet.

15. The process of claim 5 wherein said felt sheet is impregnated with asphalt.

16. The process of claim 5 wherein said felt sheet is impregnated with a synthetic rubber.

References Cited

UNITED STATES PATENTS

| | | | |
|---|---|---|---|
| 2,757,711 | 8/1956 | Petry et al. | 161—236 |
| 2,939,179 | 6/1960 | Penman et al. | 264—291 X |

FOREIGN PATENTS 204,896   12/1956   Australia.

ROBERT F. WHITE, *Primary Examiner.*

J. A. FINLAYSON, *Assistant Examiner.*